US011895692B2

(12) United States Patent
Kurita et al.

(10) Patent No.: US 11,895,692 B2
(45) Date of Patent: Feb. 6, 2024

(54) RESOURCE CONTENTION ARBITRATION APPARATUS, RESOURCE CONTENTION ARBITRATION METHOD AND PROGRAM

(71) Applicant: NIPPON TELEGRAPH AND TELEPHONE CORPORATION, Tokyo (JP)

(72) Inventors: Kaori Kurita, Musashino (JP); Kazuhiro Matsuo, Musashino (JP); Hidetaka Nishihara, Musashino (JP); Hiroki Iwahashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 370 days.

(21) Appl. No.: 17/310,561

(22) PCT Filed: Feb. 12, 2020

(86) PCT No.: PCT/JP2020/005376
§ 371 (c)(1),
(2) Date: Aug. 11, 2021

(87) PCT Pub. No.: WO2020/166617
PCT Pub. Date: Aug. 20, 2020

(65) Prior Publication Data
US 2022/0141847 A1 May 5, 2022

(30) Foreign Application Priority Data
Feb. 13, 2019 (JP) ................................. 2019-023802

(51) Int. Cl.
*H04W 72/566* (2023.01)
*H04W 72/21* (2023.01)
(Continued)

(52) U.S. Cl.
CPC ......... *H04W 72/566* (2023.01); *H04W 72/21* (2023.01); *H04W 72/535* (2023.01); *G16Y 40/35* (2020.01); *H04W 28/20* (2013.01)

(58) Field of Classification Search
CPC . H04W 72/566; H04W 72/21; H04W 72/535; H04W 28/20; G16Y 40/35
See application file for complete search history.

(56) References Cited

U.S. PATENT DOCUMENTS

2019/0150209 A1* 5/2019 Futaki ................... H04W 52/04
370/329
2019/0327124 A1* 10/2019 Lai .......................... G01S 5/017
(Continued)

FOREIGN PATENT DOCUMENTS

JP 2003-264586 9/2003

OTHER PUBLICATIONS

Kaori Kurita et al., "Optimal policy rule application method for each IoT device", IEICE Technical Report, NS2018-292, Feb. 25, 2019, vol. 118, No. 465, pp. 569-574.

*Primary Examiner* — Abdullahi Ahmed
(74) *Attorney, Agent, or Firm* — IPUSA, PLLC

(57) ABSTRACT

A resource conflict arbitration apparatus that arbitrates a conflict between resources includes: reception means configured to receive a request for resource allocation to a device among one or more devices; determination means configured to determine, when a resource requested by the resource allocation request is to be allocated to the device, whether a summed value of resources allocated to the one or more devices exceeds an upper limit value of available resources; and calculation means configured to determine, when it is determined by the determination means that the summed value exceeds the upper limit value, a status of resource allocation to each device to maximize a sum of priorities of resource allocation to the one or more devices (Continued)

under a constraint condition that a summed value of resources allocated to the devices does not exceed the upper limit value.

5 Claims, 19 Drawing Sheets

(51) Int. Cl.
*H04W 72/50* (2023.01)
*G16Y 40/35* (2020.01)
*H04W 28/20* (2009.01)

(56) References Cited

U.S. PATENT DOCUMENTS

| | | | |
|---|---|---|---|
| 2020/0015255 A1* | 1/2020 | Khoryaev | H04W 72/21 |
| 2020/0351897 A1* | 11/2020 | Fakoorian | H04W 72/0453 |
| 2021/0105126 A1* | 4/2021 | Yi | H04L 1/1671 |
| 2022/0150950 A1* | 5/2022 | Islam | H04L 1/1896 |
| 2023/0179538 A1* | 6/2023 | Duarte | H04L 41/14 |
| | | | 709/226 |

* cited by examiner (a)

LINE: 1

| DEVICE #$i$ | PRIORITY $p_i$ | ALLOCATED BANDWIDTH $c_i$ | CONSTANT $y_i$ | APPLICATION STATUS $x_i$ |
|---|---|---|---|---|
| 1 | 1 | 60 | 0 | 1 |
| 2 | 1 | 40 | 0 | 1 |
| 3 | 2 | 50 | 0 | 0 |

Fig. 17

LINE: 1, DEVICE #1

| RULE #$i$ | PRIORITY $p_i$ | ALLOCATED BANDWIDTH $c_i$ | CONSTANT $y_i$ | APPLICATION STATUS $x_i$ |
|---|---|---|---|---|
| 1 | 1 | 60 | 0 | 1 |
| 2 | 1 | 40 | 0 | 1 |
| 3 | 2 | 50 | 0 | 0 |

Fig. 19

LINE: 1

| DEVICE #i | RULE #j | PRIORITY $p_{ij}$ | ALLOCATED BANDWIDTH $c_{ij}$ | CONSTANT $y_i$ | APPLICATION STATUS $x_{ij}$ |
|---|---|---|---|---|---|
| 1 | 1 | 1 | 20 | 0 | 1 |
| | 2 | 2 | 30 | 0 | 1 |
| 2 | 1 | 2 | 40 | 0 | 0 |
| 3 | 1 | 1 | 40 | 0 | 1 |

RESOURCE CONTENTION ARBITRATION APPARATUS, RESOURCE CONTENTION ARBITRATION METHOD AND PROGRAM

TECHNICAL FIELD

The present invention relates to a technology for applying a policy rule to a device using a communication service.

BACKGROUND ART

As for a service that has been provided by a fixed network or a mobile network alone so far, demand has been increasing for making an API available to other business operators and end users and providing and changing the service through the API in further flexible and real-time manners.

Conventionally, an application policy has been determined by a fixed network BPCF or a mobile network PCRF alone, but a conflict with a policy specified by another business operator through an API needs to be considered in the future to meet the above-described demand. Similarly, consideration is needed for S9a cooperation (3GPP definition) with another business operator network.

FIGS. 1 (a) to (d) each illustrate an exemplary policy cooperation model. FIG. 1 (a) illustrates an exemplary model of policy cooperation between another business operator and a fixed network through an API, FIG. 1 (b) illustrates an exemplary model of policy cooperation between an end user and a fixed network through an API, FIG. 1 (c) illustrates an exemplary model of policy cooperation between another business operator and a mobile network through an API, and FIG. 1 (d) illustrates an exemplary model of policy cooperation between a fixed network and a mobile network.

Recently, diversification has been occurring to IoT devices connected with a network, such as a network camera and a television. In particular, it is expected that, in the 5G/IoT era, diversification occurs to IoT devices (camera, sensor, and the like) connected with a NW and also occurs to policies for each device (for example, prioritized control of a video of a monitoring camera).

CITATION LIST

Patent Literature

Patent Literature 1: Japanese Patent Laid-open No. 2003-264586

SUMMARY OF THE INVENTION

Technical Problem

In a carrier network in anticipation of the 5G/IoT era, (1) policy application from the own NW, (2) policy application from a user through an API, and (3) policy application from another business operator through an API to these IoT devices potentially conflict with one another. FIG. 2 illustrates an example of such a conflict. In the example illustrated in FIG. 2, the own NW is a mobile network including a PCRF 10 and the like. As illustrated in FIG. 2, a policy (Rule #2) instructed by a user 30, a policy (Rule #1) instructed by the own NW, and a policy (Rule #3) instructed by another business operator conflict with one another at IoT-GW #1. More specifically, the conflict is a conflict among bands as communication resources.

However, no technology for arbitrating a conflict between resources as described above has been disclosed.

The present invention has been made to solve the above-described problem and aims to provide a technology capable of arbitrating a conflict between resources for a device using a communication service.

Means for Solving the Problem

The disclosed technology provides a resource conflict arbitration apparatus that arbitrates a conflict between resources, the resource conflict arbitration apparatus including:

reception means configured to receive a request for resource allocation to a device among one or more devices;

determination means configured to determine, when a resource requested by the resource allocation request is to be allocated to the device, whether a summed value of resources allocated to the one or more devices exceeds an upper limit value of available resources; and calculation means configured to determine, when it is determined by the determination means that the summed value exceeds the upper limit value, a status of resource allocation to each device to maximize a sum of priorities of resource allocation to the one or more devices under a constraint condition that a summed value of resources allocated to the devices does not exceed the upper limit value.

Effects of the Invention

According to the disclosed technology, it is possible to arbitrate a conflict between resources for a device using a communication service.

BRIEF DESCRIPTION OF DRAWINGS

FIG. 16 is a diagram for description of a specific example.

FIG. 17 is a diagram for description of a specific example.

FIG. 19 is a diagram for description of a specific example.

DESCRIPTION OF EMBODIMENTS

Figure 1:
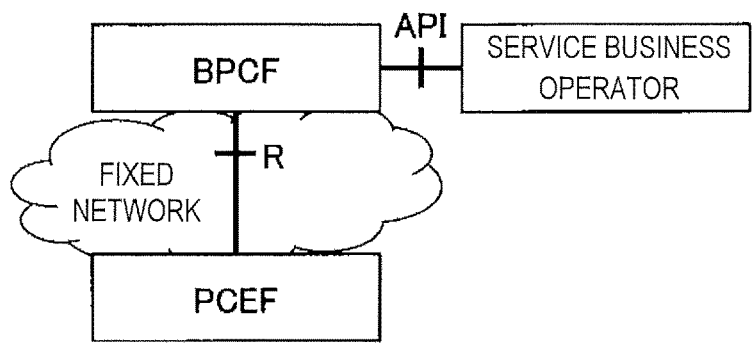
FIG. 1 is a diagram illustrating an exemplary policy cooperation model.
Figure 1:
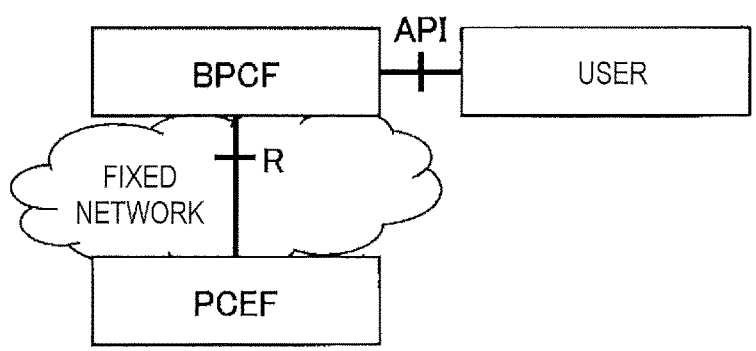
Figure 1:
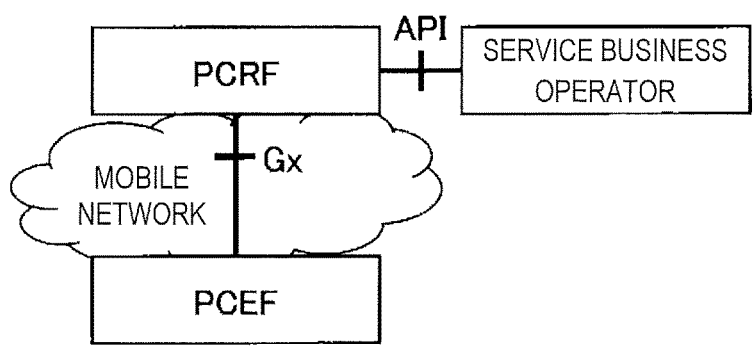
Figure 1:
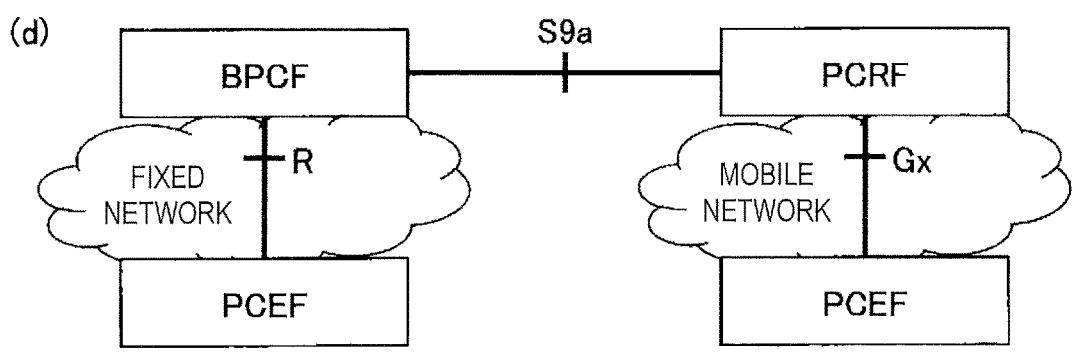

An embodiment of the present invention (the present embodiment) will be described below with reference to the accompanying drawings. The embodiment described below is merely exemplary, and an embodiment to which the present invention is applied is not limited to the embodiment below.

For example, although operation of the present invention is executed by a PCRF in an example below, the present invention is also applicable to an apparatus other than the PCRF. In addition, although arbitrated resources are communication bands in the example below, the present invention is applicable to arbitration of resources not limited to bands. Hereinafter, operation and the like related to a problem will be described first, and thereafter, a technology according to the present invention will be described.

(Problem)

A typical policy management and control scheme will be described with reference to FIG. 3. A system configuration illustrated in FIG. 3 is same as that in FIG. 2, and an own NW (own business operator) is a mobile network including a PCRF 10 and a PCEF 20. A policy and charging rule function (PCRF) is a node configured to manage policy information, and a policy and charging enforcement function (PCEF) is a node configured to execute policy control. The PCEF is often included in a P-GW.

The own NW is connected with an IoT-GW 50 (user apparatus) in which various kinds of devices are housed. The own NW is also connected with a user 30 (specifically, a user terminal or the like) and another business operator 40 (apparatus or the like connected with a network of another business operator) through APIs, respectively. In an example illustrated in FIG. 3, a line (specifically, a VLAN or the like) between the IoT-GW 50 and the own NW has a contract band of 100 Mbps. In other words, the upper limit value of a usable band is 100 Mbps.

Policy application can be dynamically instructed to the PCEF 20 by the PCRF 10, and policy application can be instructed to the PCEF 20 by the user 30 or the other business operator 40 through the API.

In the example illustrated in FIG. 3, the user 30 instructs policy application of 50 Mbps guarantee (high priority) to Device #2, the other business operator 40 instructs policy application of 50 Mbps guarantee (high priority) to Device #3, and the own NW (the PCRF 10) instructs policy application of 50 Mbps guarantee (high priority) to Device #1. The content of a policy is referred to as a "rule". The "rule" may be referred to as a "policy rule".

The high-priority bands instructed by the above-described policies is summed to 150 Mbps. Specifically, the sum of guarantee bands exceeds the contract band when the high-priority rule with the own PCRF through an API is applied. Accordingly, a resource conflict occurs.

This resource conflict needs to be appropriately arbitrated by the PCRF 10. The conventional technology has no configuration for arbitrating a conflict when policy application is instructed through an API, and cannot perform arbitration.

Figure 4:
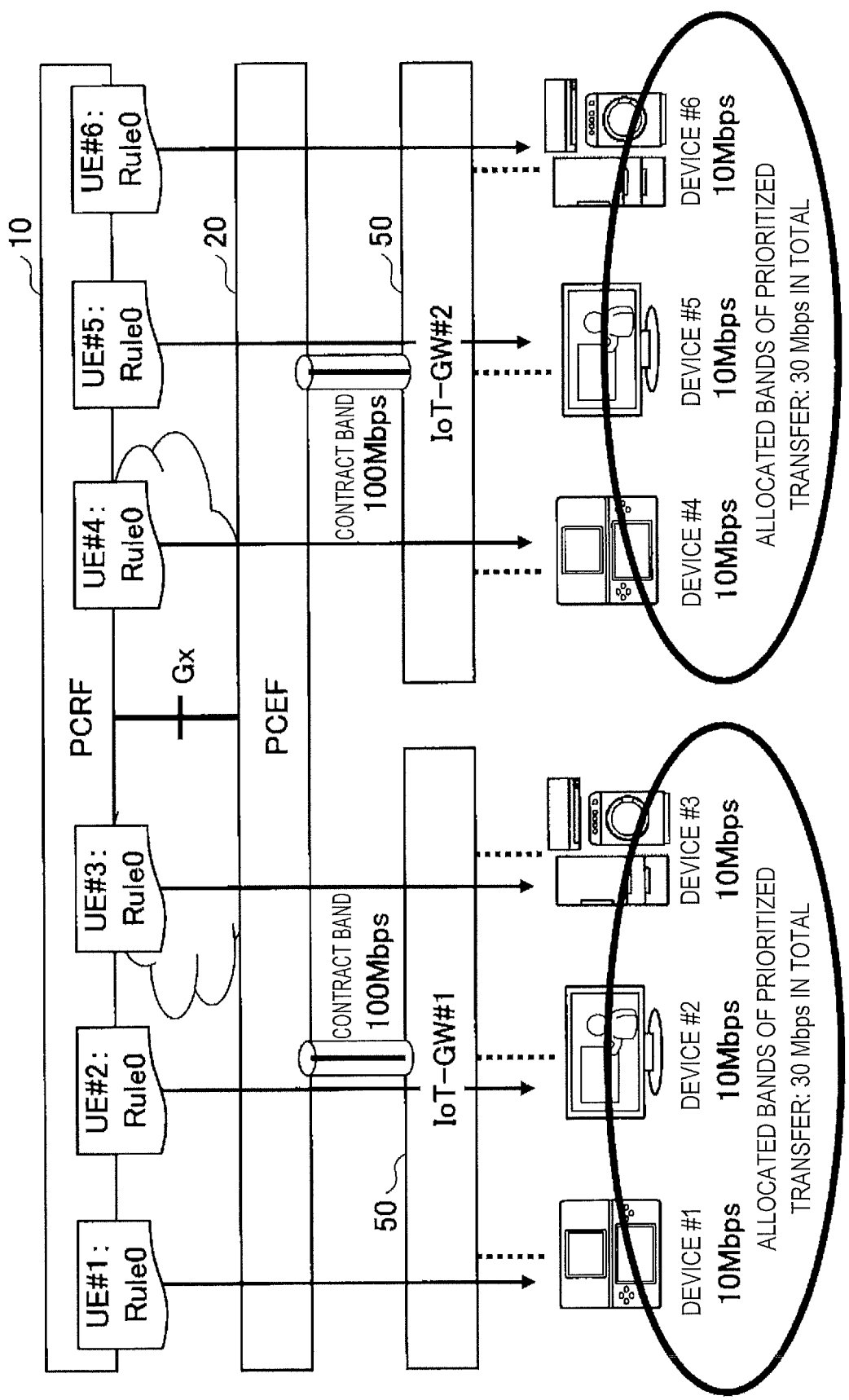
FIG. 4 is a diagram for description of a problem.
Figure 5:
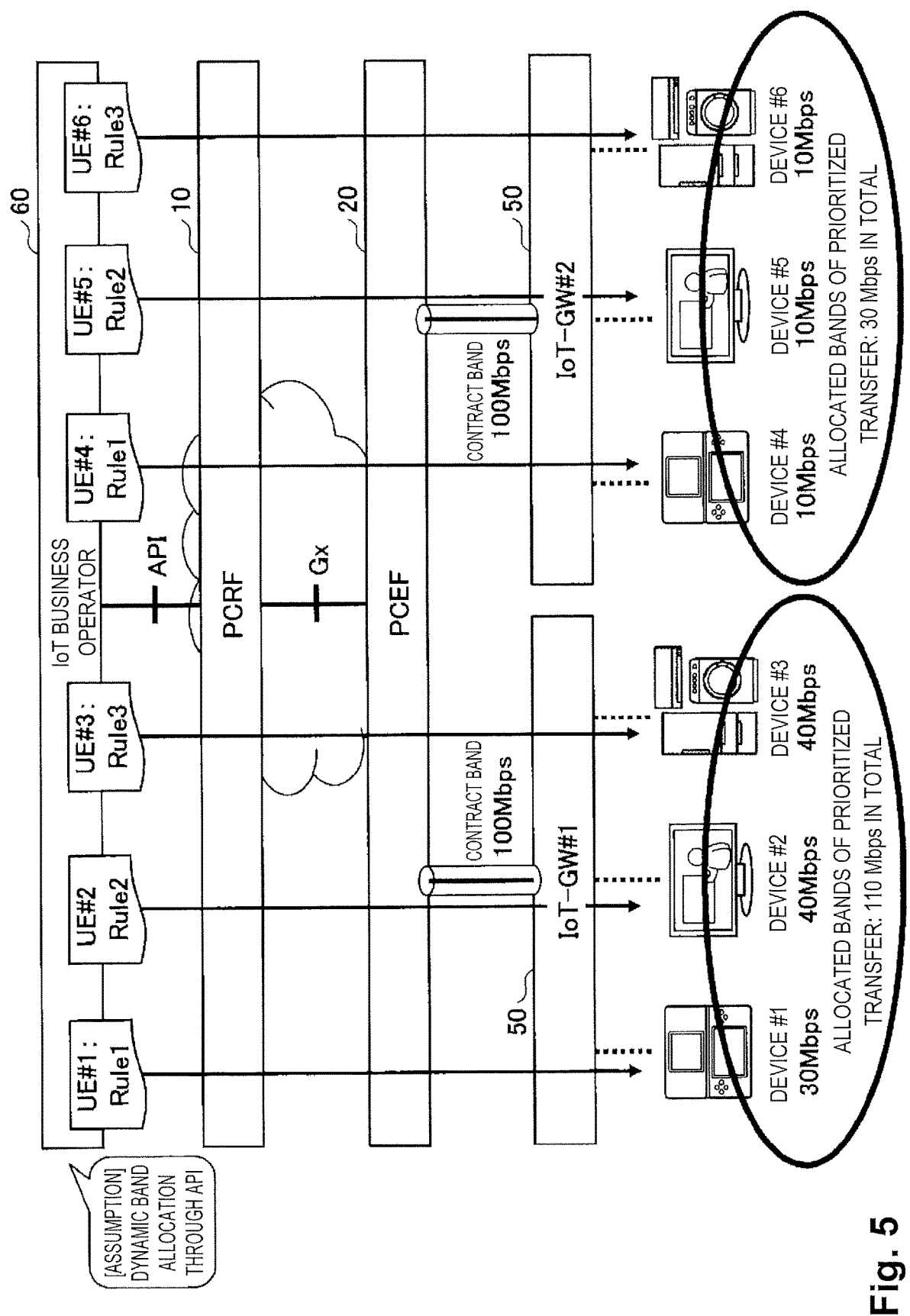
FIG. 5 is a diagram for description of a problem.

FIGS. 4 and 5 illustrate other examples in which a problem occurs. FIG. 4 is provided for comparison with FIG. 5 and illustrates a case in which policy control is performed by the PCRF 10 of the own NW. As illustrated in FIG. 4, the PCRF 10 of the own NW instructs policy application to Devices #1 to #3 under IoT-GW #1 and Devices #4 to #6 under IoT-GW #2. As illustrated in FIG. 4, for each of IoT-GW #1 and IoT-GW #2, an allocated band of prioritized transfer is equal to or smaller than the contract band.

FIG. 5 illustrates an example in which policy control is performed by another business operator (in this example, an IoT business operator 60) through an API. As illustrated in FIG. 5, the IoT business operator 60 instructs policy application to Devices #1 to #3 under IoT-GW #1 and Devices #4 to #6 under IoT-GW #2. As illustrated in FIG. 5, the allocated band of prioritized transfer at IoT-GW #1 is 110 Mbps in total and exceeds the contract band.

In this manner, with the conventional technology, it is impossible to detect a case in which (total band of bands requested for devices under one VLAN)>(allocated band of one VLAN) holds when policy control is performed by another business operator (in this example, the IoT business operator 60) through an API.

A technology of solving the above-described problems and enabling optimization of rule application to devices by arbitrating a resource conflict appropriately through a PCRF will be described below as an embodiment of the present invention.

Overview of Embodiment

Figure 2:
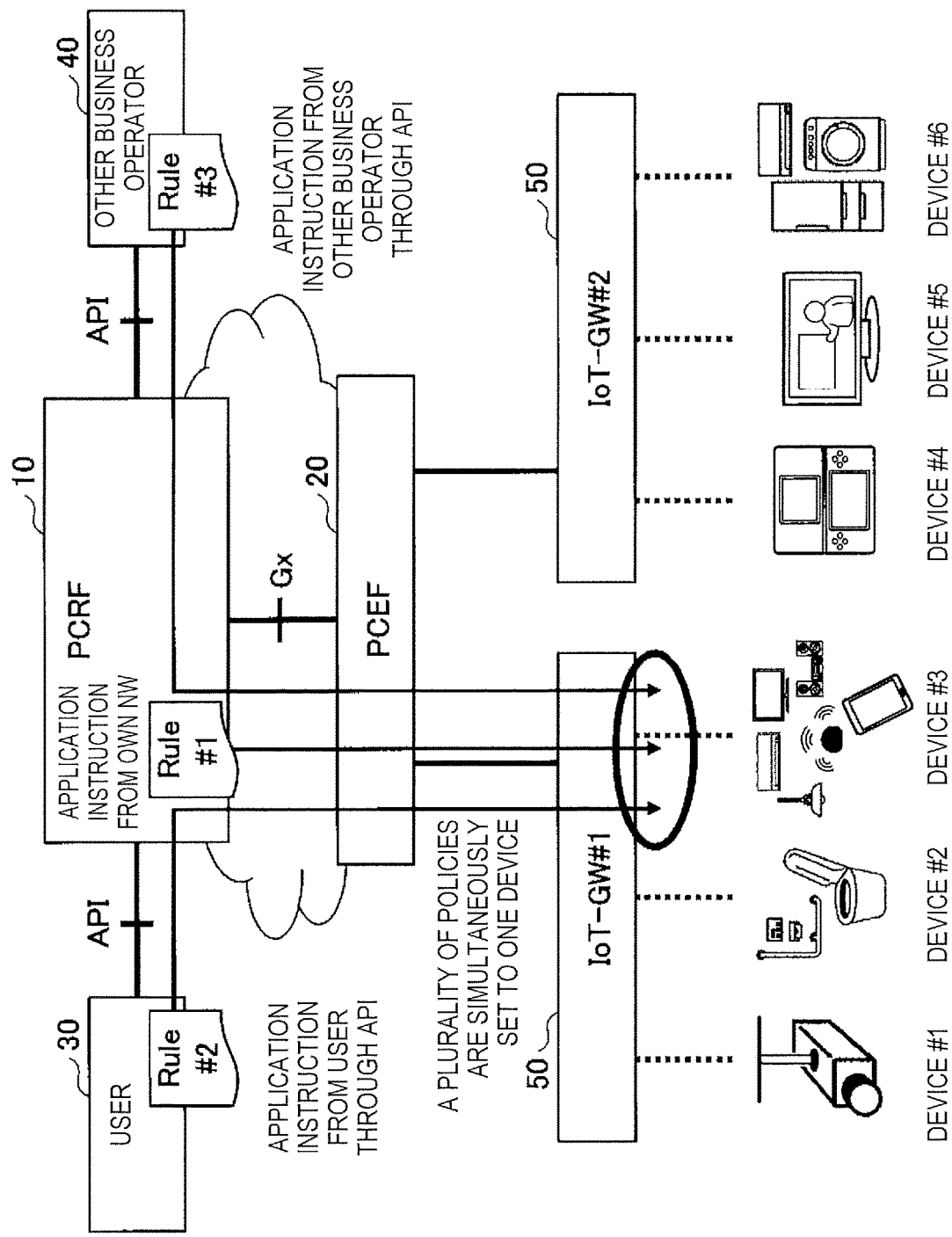
FIG. 2 is a diagram illustrating policy cooperation for each IoT device.
Figure 3:
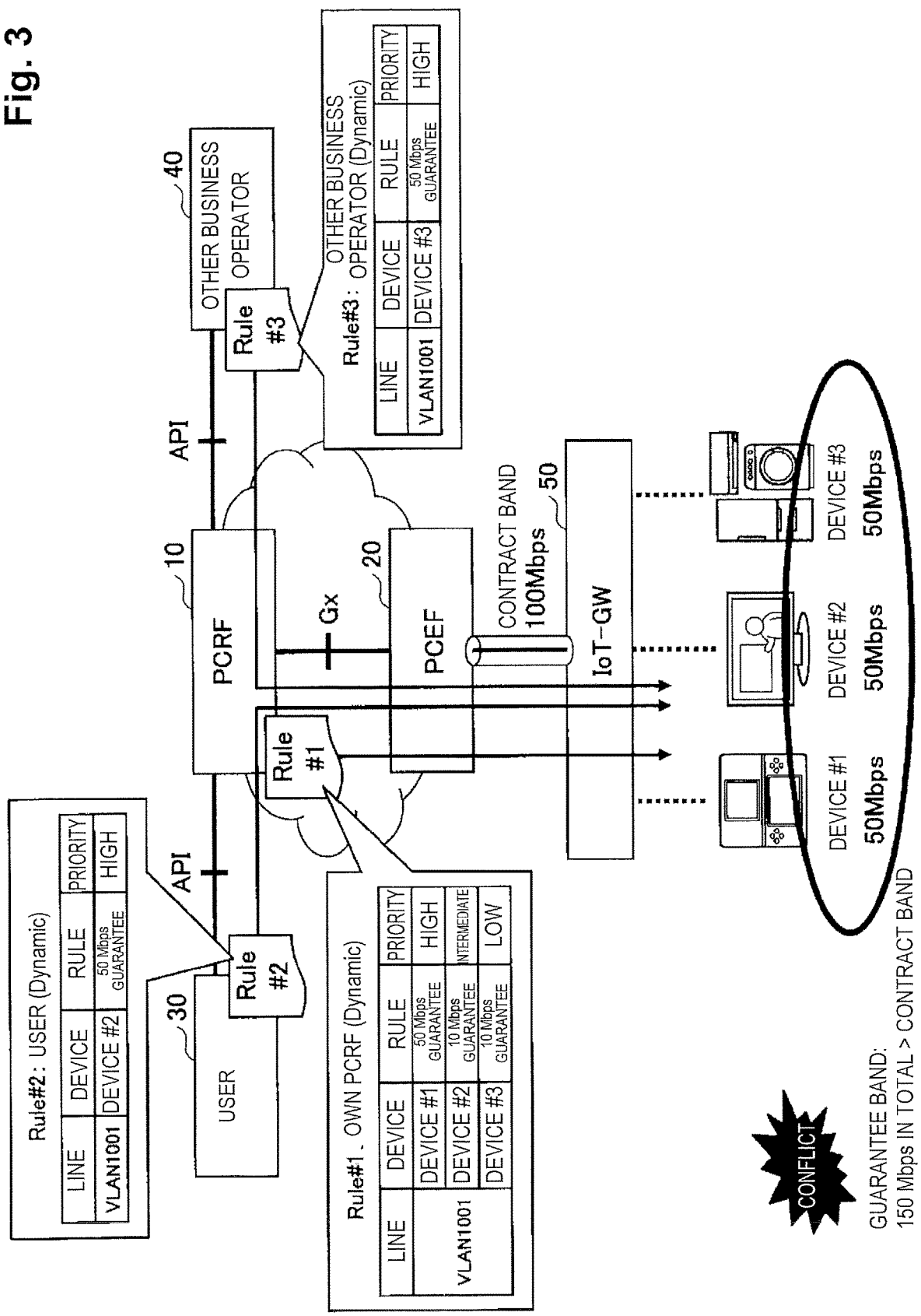
FIG. 3 is a diagram illustrating an exemplary policy management and control scheme.

A system configuration in the present embodiment is the system configuration illustrated in, for example, FIG. 2. However, the PCRF has functions according to the present invention. Hereinafter, the PCRF having functions of the present invention is referred to as a "PCRF 100" to distinguish the PCRF having functions of the present invention from the conventional "PCRF 10". Since the PCRF 100 has a function of arbitrating a conflict between resources, the PCRF 100 may be referred to as a resource conflict arbitration apparatus.

In the present embodiment, a process in which the PCRF 100 instructs, to each device, policy application related to an allocated band is regarded as an online 0-1 knapsack problem. In the present embodiment, policy rule application is arbitrated by a branch-and-bound method at the PCRF 100.

Consider an example in which one rule is applied to one device. The contract band is represented by b, the number of devices to which rule application is to be instructed is represented by n, and instruction of rule application to Device i instructs use of bandwidth $c_i$ with priority $p_i$ (it is assumed that priority standards are unified). With such an assumption, the PCRF 100 solves a problem related to rule selection that maximizes the sum of priorities of application rules for devices within the contract band.

Figure 6:
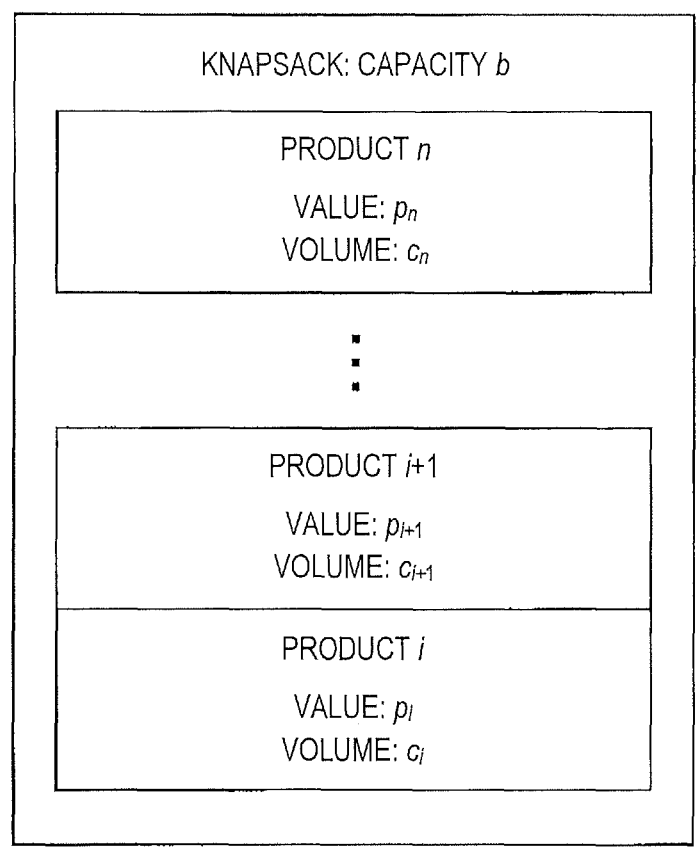
FIG. 6 is a diagram for description of an overview of an embodiment of the present invention.

The following describes an online knapsack problem. As illustrated in FIG. 6, the online knapsack problem is a problem related to product selection when one knapsack having a capacity b and products (each having a value $p_i$ and a volume $c_i$) of n kinds are provided, the product selection maximizing the sum of the values of packed products while the capacity of the knapsack is not exceeded.

Figure 7:
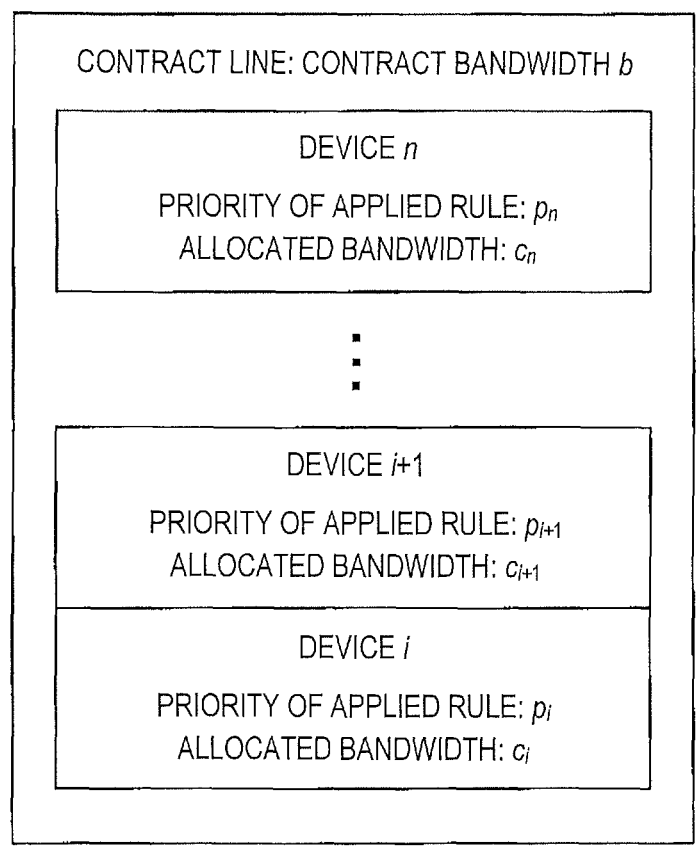
FIG. 7 is a diagram for description of the overview of the embodiment of the present invention.

FIG. 7 illustrates application of the online knapsack problem to an online optimization problem of allocated bands of devices in the present embodiment. The online optimization problem of allocated bands of devices in the present embodiment is a problem related to device rule selection when one contract line of a contract bandwidth b and n devices (each having an application rule priority $p_i$ and an allocated bandwidth $c_i$) are provided, the device rule selection maximizing the sum of the priorities of application rules applied for the respective devices while the contract bandwidth of the contract line is not exceeded.

Figure 8:
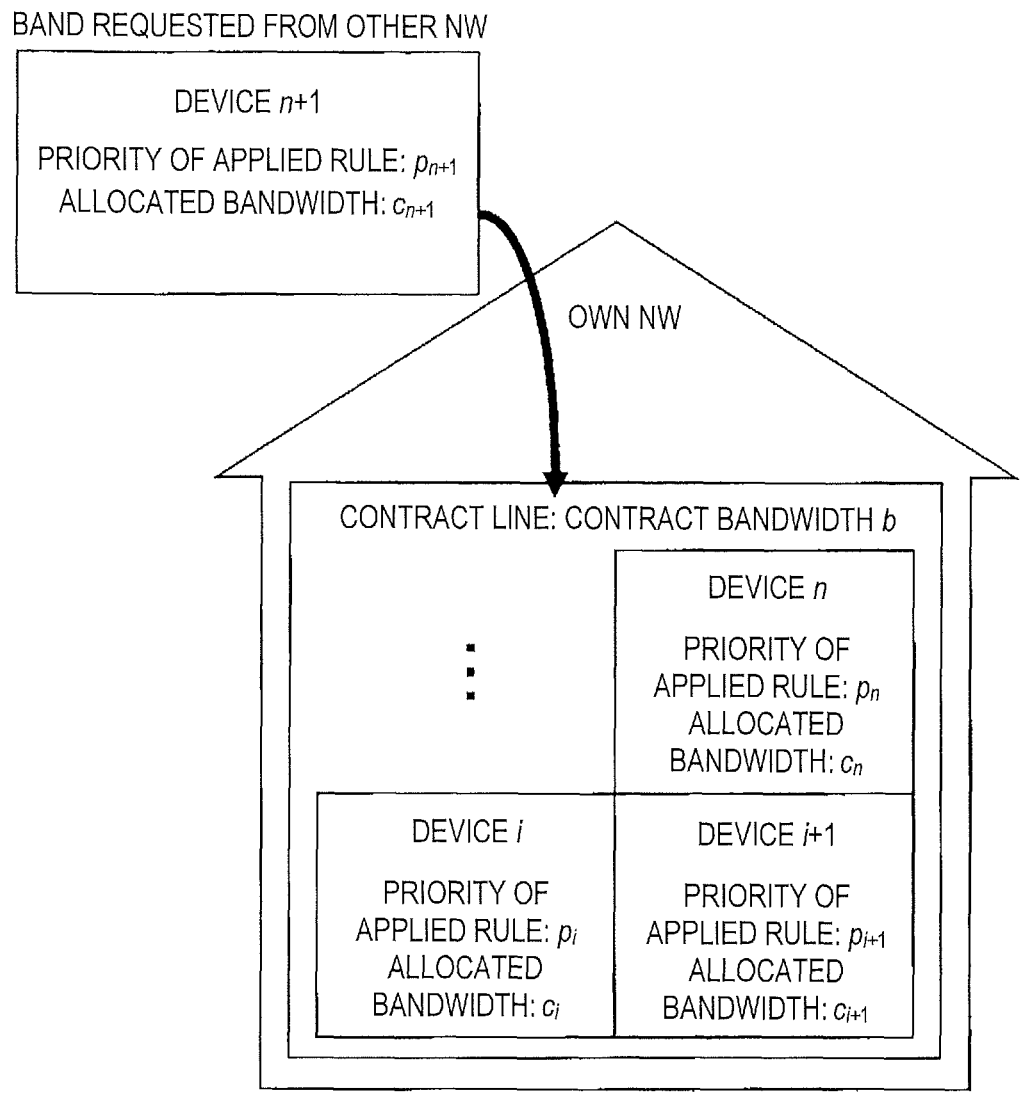
FIG. 8 is a diagram for description of the overview of the embodiment of the present invention.

In particular, the present embodiment assumes a problem when rules are applied to the n devices, rule application is instructed through APIs, and accordingly, a conflict occurs as illustrated in FIG. 8.

(System Configuration)

Figure 9:
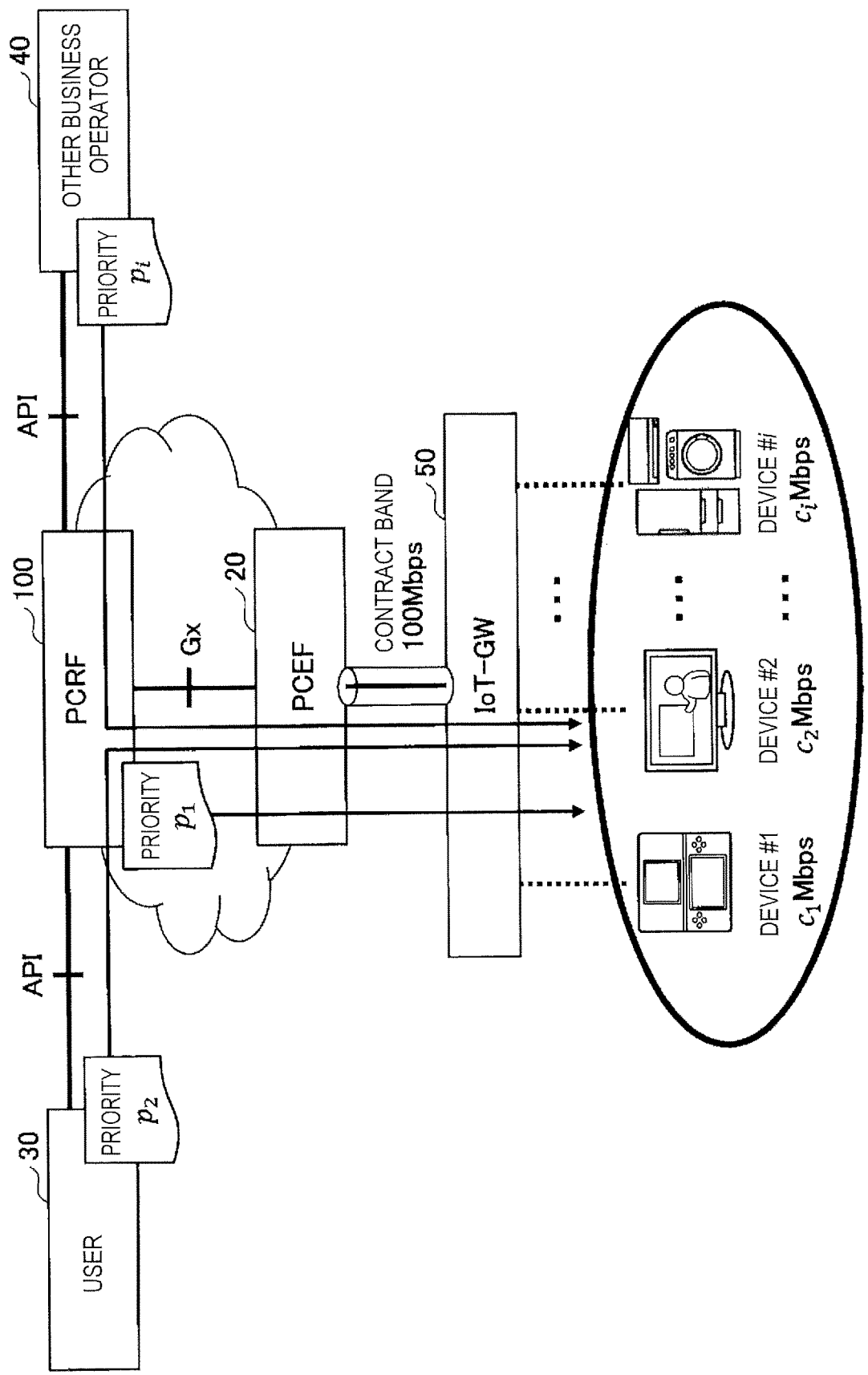
FIG. 9 is a system configuration diagram in the embodiment of the present invention.

FIG. 9 illustrates an exemplary system configuration in the present embodiment. As illustrated in FIG. 9, a mobile network (own NW) includes the PCEF 20, and the PCRF 100 having functions according to the present invention. The IoT-GW 50 is connected with the own NW, and Devices #1 to #i are connected under the IoT-GW 50. The PCRF 100 of the own NW can instruct policy rule application to each device, and the user 30 and the other business operator 40 can each instruct, through an API, policy rule application to each device via the PCRF 100.

(Basic Operation)

The PCRF 100 determines application of an optimum policy rule for each device by solving the above-described optimization problem.

Figure 10:
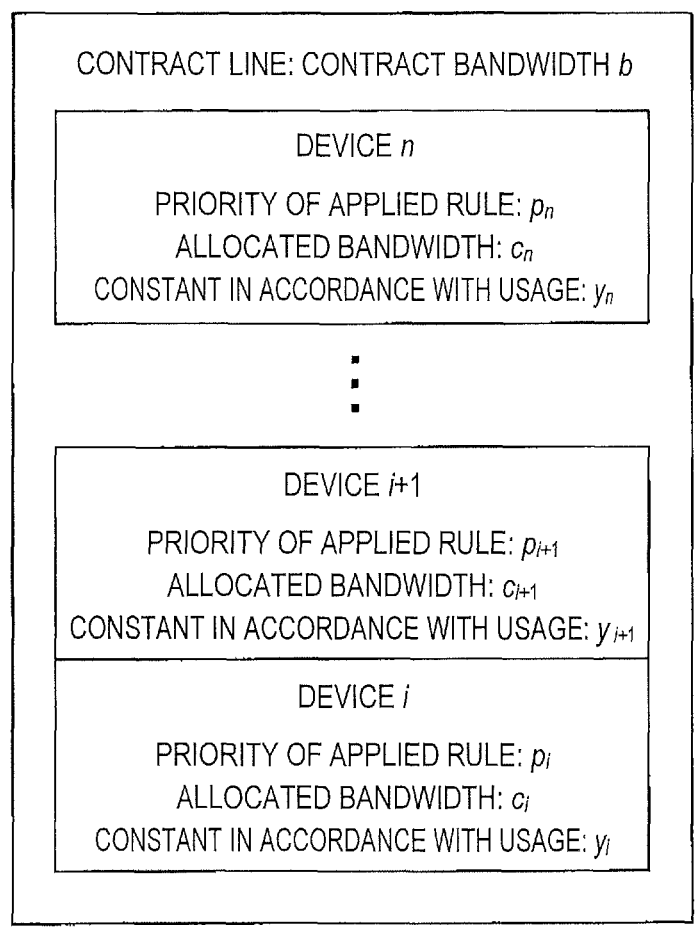
FIG. 10 is a diagram illustrating a problem of optimizing bands allocated to devices.

Specifically, a case in which one Rule is applied to one device will be described. A parameter $x_i=1$ indicates a case in which a rule is applied to Device i, and $x_i=0$ indicates a case no rule is applied. The contract band is represented by b, and the number of devices to which rule application is to be instructed is represented by n. The priority of application of each rule to Device i is represented by $p_i$, an allocated bandwidth instructed by the rule is represented by $c_i$, and a constant in accordance with usage of an application or the like is represented by $y_i$. FIG. 10 lists these parameters. The constant $y_i$ is a constant determined for each application in advance. Alternatively, $y_i$ may not be used.

To maximize the sum of the priorities of application rules of devices within the contract band, the PCRF 100 determines the value of $x_i$ that maximize an objective function $z=\Sigma^n_{i=1}(p_i x_i + y_i)$ (constraint condition $\Sigma^n_{i=1} c_i x_i < b$, $x_i \in \{0, 1\}$, $-1 \leq y_i \leq 1$ (i=1, 2, ..., n), $p_i \geq 0$, $c_i \geq 0$, $\forall$ i∈n)).

Figure 11:
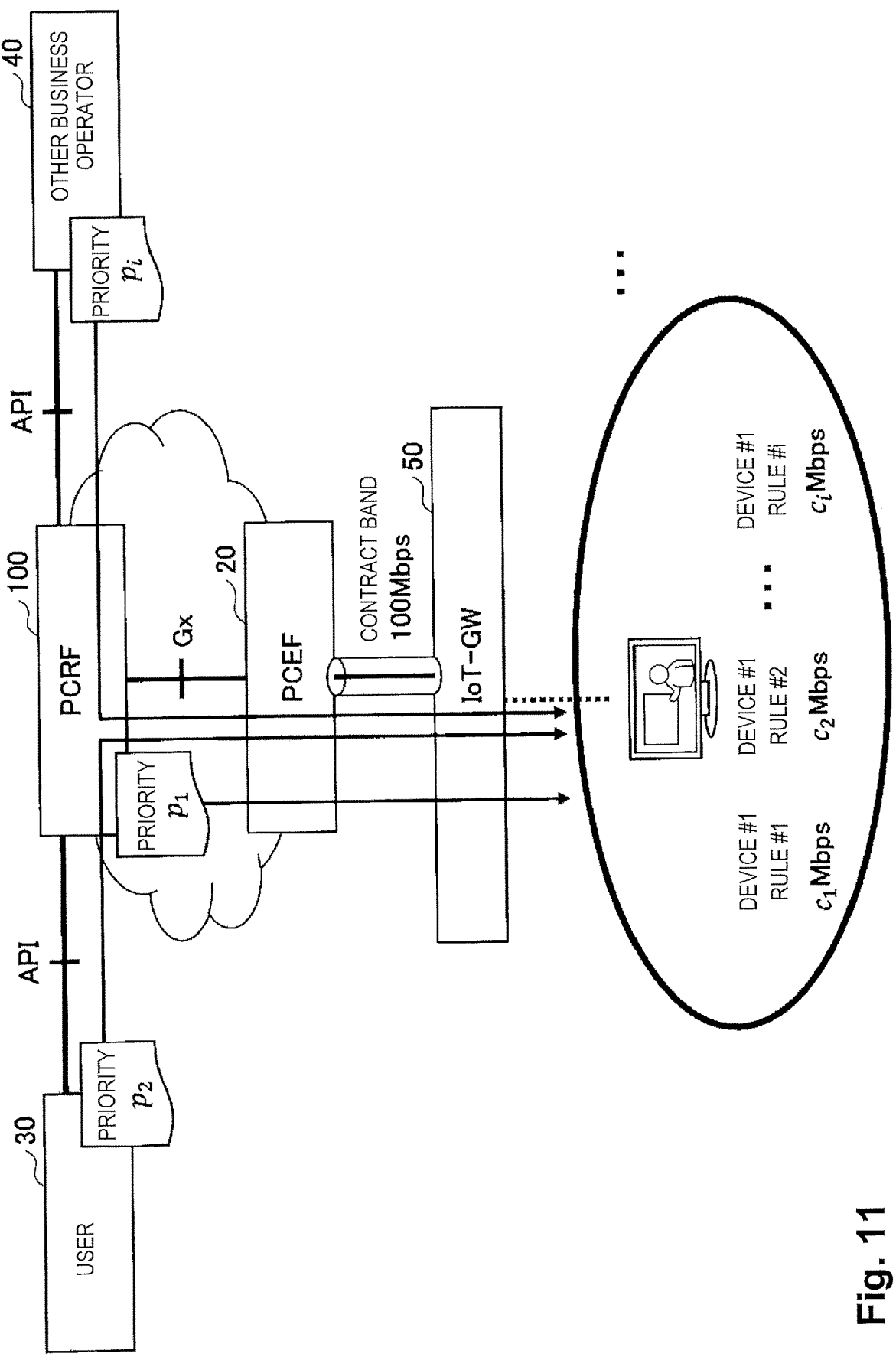
FIG. 11 is a system configuration diagram in the embodiment of the present invention.

As illustrated in FIG. 11, the above description is same when a plurality of rules are applied to one device. In this case, Device #1 is considered as the one device. The parameter $x_i=1$ when Rule i is applied to Device #1, and $x_i=0$ when Rule i is not applied. The contract band is represented by b, and the number of rules is represented by n. The priority of each Rule i is represented by $p_i$, an allocated bandwidth instructed by Rule i is represented by $c_i$, and a constant in accordance with usage of an application or the like is represented by $y_i$.

To maximize the sum of the priorities of rules in the contract band, the PCRF 100 determines the value of $x_i$ that maximizes the objective function $z=\Sigma^n_{i=1}(p_i x_i + y_i)$ (constraint condition $\Sigma^n_{i=1} c_i x_i < b$, $x_i \in \{0, 1\}$, $-1 \leq y_i \leq 1$ (i=1, 2, ..., n), $p_i \geq 0$, $c_i \geq 0$, $\forall$ i∈n)).

The PCRF 100 can solve the above-described 0-1 knapsack problem by using the branch-and-bound method. The PCRF 100 can efficiently solve the above-described 0-1 knapsack problem by, for example, using a relaxation problem. Various kinds of existing technologies can be used to solve the above-described optimization problem.

Figure 12:
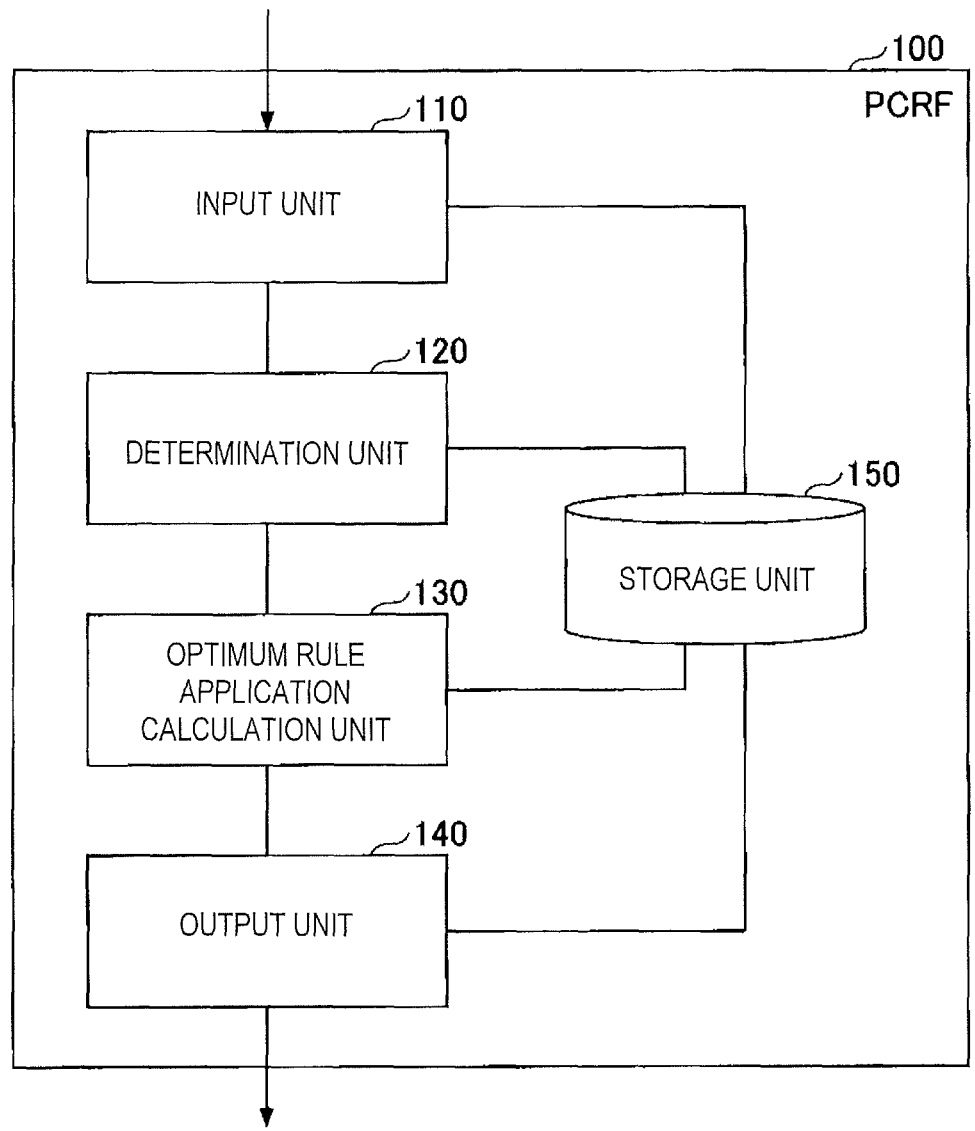
FIG. 12 is a configuration diagram of a PCRF.

(Exemplary apparatus configuration) FIG. 12 illustrates an exemplary functional configuration of the PCRF 100. As illustrated in FIG. 12, the PCRF 100 includes an input unit 110, a determination unit 120, an optimum rule application calculation unit 130, an output unit 140, and a storage unit 150.

The input unit 110 receives an instruction for application of a rule from the outside (such as an operation system of the own NW, or another business operator or a user through an API) and inputs the rule to the inside of the PCRF 100. The determination unit 120 determines whether the sum of bands allocated to devices exceeds the contract band of a line when the input rule is applied.

When it is determined by the determination unit 120 that the sum of bands allocated to devices exceeds the contract band of the line, in other words, that a resource conflict would occur, the optimum rule application calculation unit 130 solves the above-described optimization problem to calculate application of an optimum rule to each device.

The output unit 140 instructs the PCEF 20 to apply each optimum rule. The output unit 140 notifies the instruction source of an application status (whether application is executed) of a rule application instruction received through an API.

The storage unit 150 stores a table that manages each rule instructed to each device, execution of application of the rule, and the like.

The PCRF 100 can be achieved by, for example, causing a computer to execute a computer program in which processing contents described in the present embodiment are written.

The PCRF 100 can be achieved by executing a computer program corresponding to processing performed by the PCRF 100 by using hardware resources such as a CPU and a memory built in the computer. The above-described computer program may be recorded in a computer-readable recording medium (such as a portable memory) for storage and distribution. In addition, the above-described computer program may be provided through a network such as the Internet or electronic mail.

Figure 13:
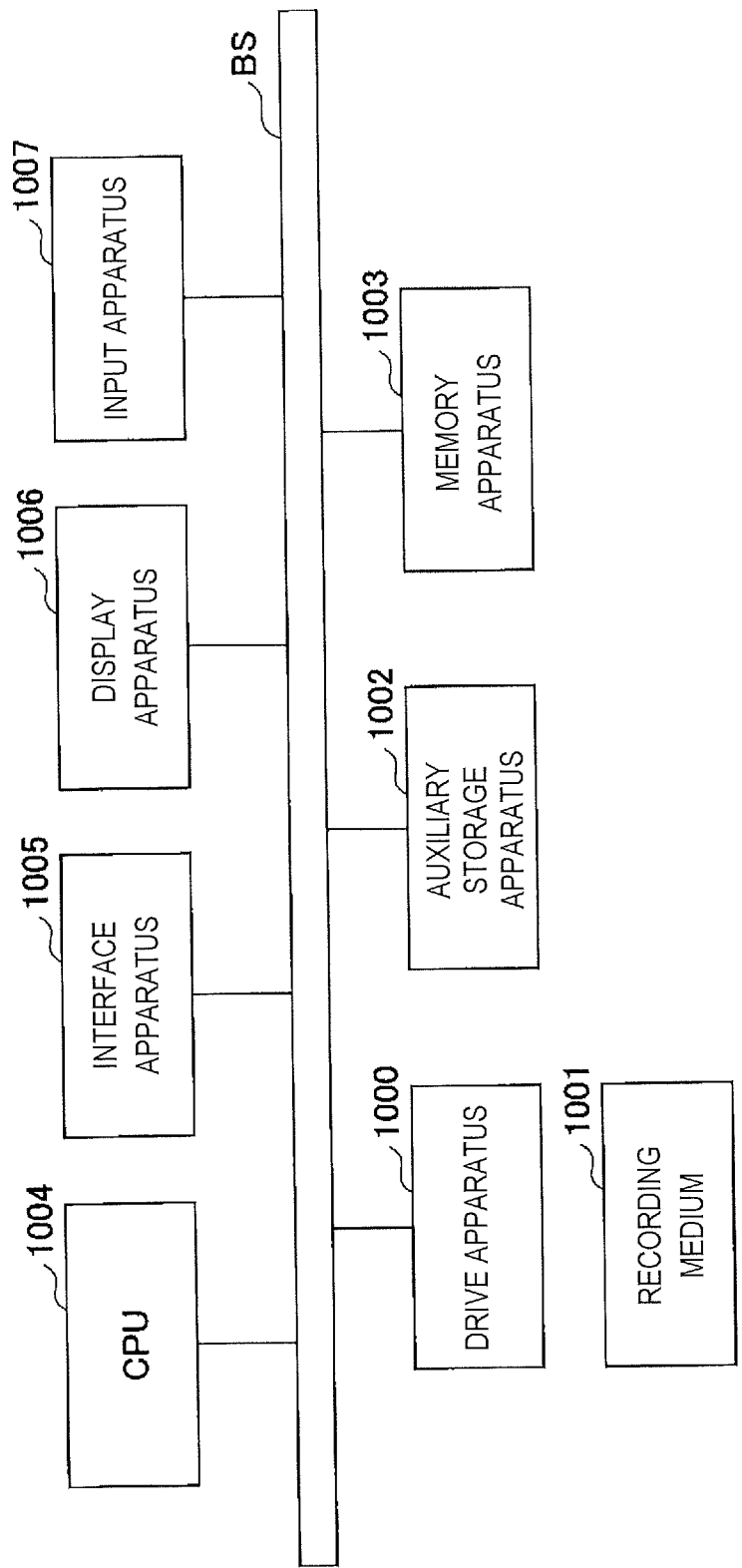
FIG. 13 is a diagram illustrating an exemplary hardware configuration of an apparatus.

FIG. 13 is a diagram illustrating an exemplary hardware configuration of the above-described computer in the present embodiment. The computer in FIG. 13 includes a drive apparatus 1000, an auxiliary storage apparatus 1002, a memory apparatus 1003, a CPU 1004, an interface apparatus 1005, a display apparatus 1006, an input apparatus 1007 and the like, which are mutually connected through a bus B.

The computer program that achieves processing at the computer is provided by a recording medium 1001 such as a CD-ROM or a memory card. When the recording medium 1001 storing the computer program is set to the drive apparatus 1000, the computer program is installed from the recording medium 1001 onto the auxiliary storage apparatus 1002 through the drive apparatus 1000. However, installation of the computer program does not necessarily need to be performed from the recording medium 1001 but may be downloaded from another computer through a network. The auxiliary storage apparatus 1002 stores the installed computer program as well as necessary files, data, and the like.

When activation of the computer program is instructed, the memory apparatus 1003 reads the computer program from the auxiliary storage apparatus 1002 and stores the computer program. The CPU 1004 achieves functions of the PCRF 100 in accordance with the computer program stored in the memory apparatus 1003. The interface apparatus 1005 is used as an interface for connection with a network. The display apparatus 1006 displays, for example, a graphical user interface (GUI) provided by the computer program. The input apparatus 1007 is configured by a keyboard, a mouse, a button, a touch panel, or the like and used to input various operation instructions.

(Exemplary System Operation)

Figure 14:
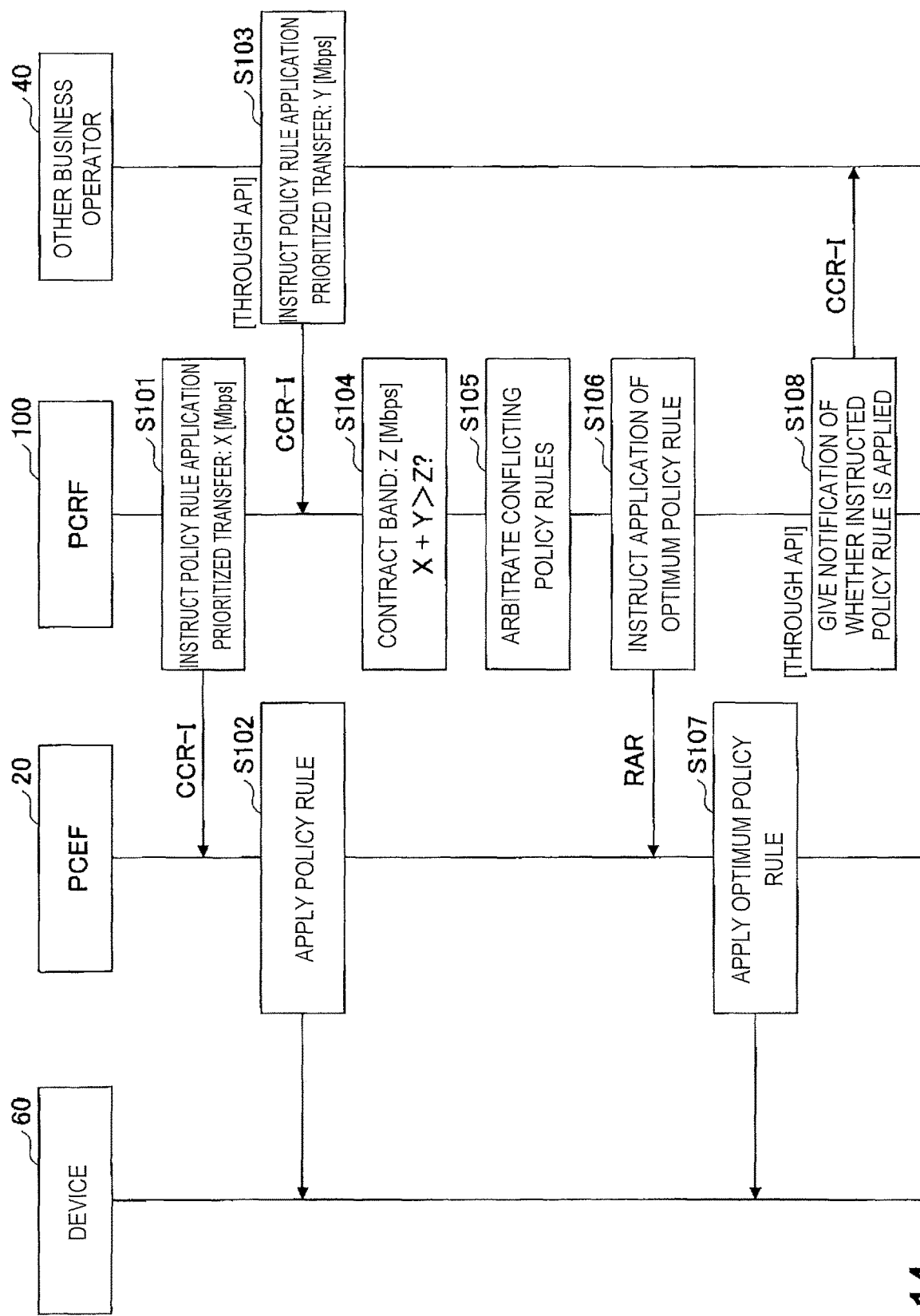
FIG. 14 is a sequence diagram for description of exemplary operation of a system.
Figure 15:
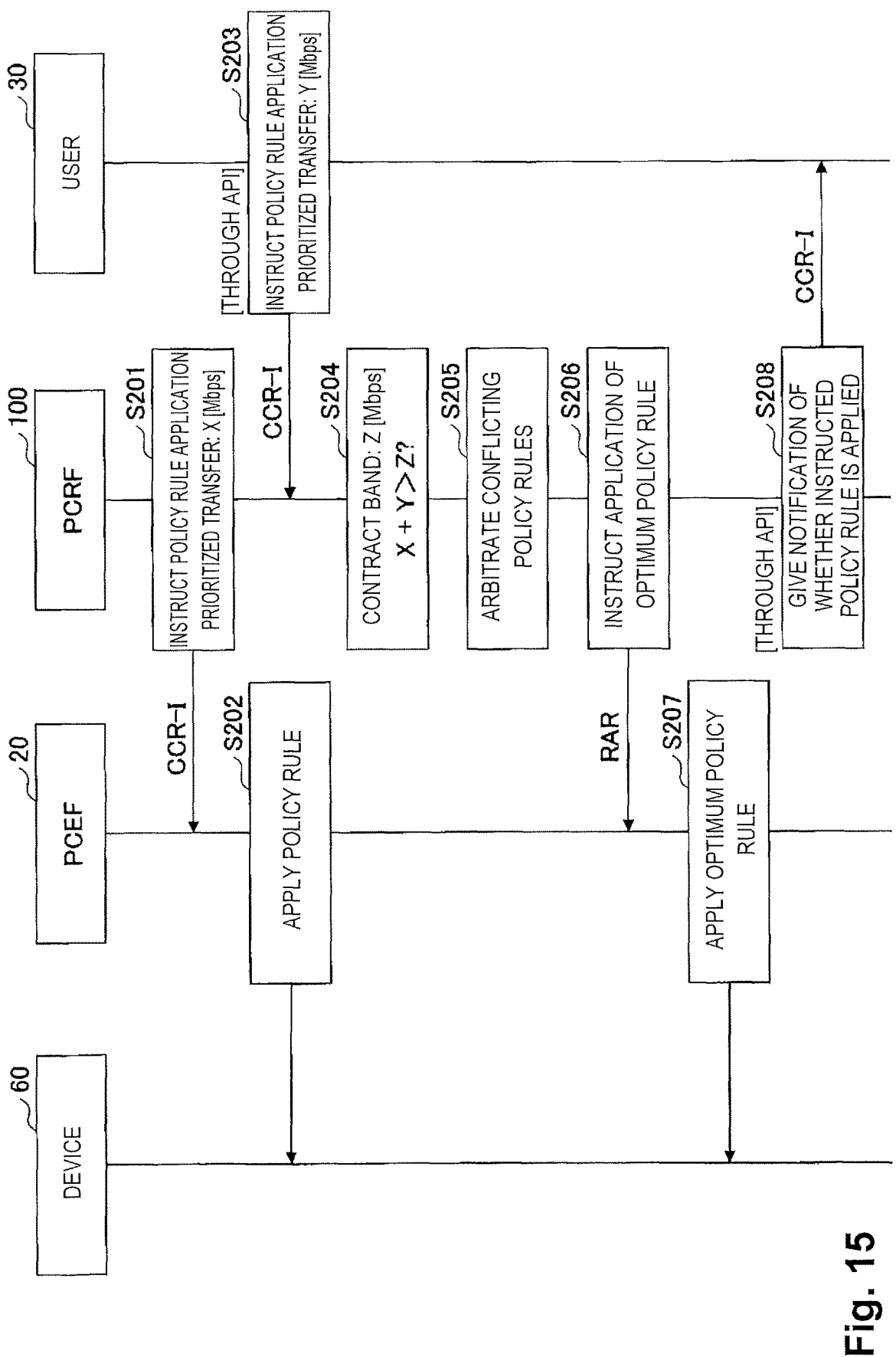
FIG. 15 is a sequence diagram for description of exemplary operation of the system.

The following describes exemplary system operation with reference to FIGS. 14 and 15. FIGS. 14 and 15 each illustrate a case in which a plurality of rules are applied to one device. The same sequence is executed also when one rule is applied to one device.

At S101 and S102 in FIG. 14, a policy rule of own NW management is applied to a device 60. This rule allocates a band of X [Mbps].

At S103, a policy rule application instruction for allocating a band of Y [Mbps] is transferred from the other business operator 40 to the PCRF 100 through an API. The contract band is Z [Mbps], and X+Y>Z holds.

At S104, the determination unit 120 of the PCRF 100 senses X+Y>Z and determines that a conflict is to be arbitrated. At S105, the optimum rule application calculation unit 130 solves the above-described optimization problem (0-1 knapsack problem) to calculate the application status of each rule.

At S106, the output unit 140 notifies the PCEF 20 of an instruction of optimum rule application as a result of the calculation by the optimum rule application calculation unit 130. At S107, the PCEF 20 applies an instructed rule to the device 60. At S108, the output unit 140 notifies the other business operator 40 as the instruction source of whether a rule of the rule application instruction through an API is applied.

In FIG. 15, in place of the other business operator 40 in FIG. 14, the user 30 executes a policy application instruction through an API. The same processing in FIG. 14 except that the other business operator 40 is changed to the user 30 is performed.

SPECIFIC EXAMPLES

The following describes specific examples of calculation of rule arbitration by the optimum rule application calculation unit 130. In the following description, priority is higher as the value thereof is larger. The unit of a band is Mbps, and the contract band b is 100. It is thought that, for sake of simplicity, $y_i$ is all zero.

Example 1

The following describes Example 1 with reference to FIG. 16. Example 1 assumes a case in which one rule is applied to one device.

In Example 1, Devices #1, #2, and #3 are accommodated in Line #1 (contract band: 100). Allocated bands of 60 and 40 are already allocated to Devices 1 and #2, respectively, by the own NW. Their priorities are 1 and 1. In this case, the storage unit 150 of the PCRF 100 stores a table having data of Devices #1 and #2 in FIG. 16.

Consider a case in which an instruction for application of a rule with a priority of 2 and an allocated band of 50 to Device #3 is received through an API. In this case, the sum of allocated bands is 150, which exceeds 100. FIG. 16 illustrates a table when this instruction is received.

Thus, the optimum rule application calculation unit 130 performs arbitration. Specifically, the value of $x_i$ is determined that maximizes the objective function $z=\Sigma^n_{i=1}(p_i x_i + y_i)$ (constraint condition $\Sigma^n_{i=1} c_i x_i < b$, $x_i \in \{0, 1\}$, $-1 \leq y_i \leq 1$ (i=1, 2, ... n), $p_i \geq 0$, $c_i \geq 0$, $\forall i \in n$)).

In this case, $x_1=0$, $x_2=1$, and $x_3=1$ are obtained as a solution, and cells in the column of $x_i$ in the table in FIG. 16 are rewritten to 0, 1, and 1 from the top. As a result, the output unit 140 transmits, to the PCEF 20, a rule application instruction indicating that a rule is not to be applied to Device #1, a rule is to be applied to Device #2, and a rule is to be applied to Device #3. The PCEF 20 executes rule application in accordance with the instruction.

Example 2

The following describes Example 2 with reference to FIG. 17. Example 2 assumes a case in which a plurality of rules are applied to one device (Device #1).

In Example 2, Device #1 is accommodated in Line #1 (contract band: 100). Allocated bands of 60 and 40 are already allocated to Device #1 by the own NW as Rules #1 and #2. Their priorities are 1 and 1. In this case, the storage unit 150 of the PCRF 100 stores a table having data of Rules #1 and #2 in FIG. 17.

Consider a case in which an instruction for application of Rule #3 with a priority of 2 and an allocated band of 50 to Device #1 is received through an API. In this case, the sum of allocated bands is 150, which exceeds 100. FIG. 17 illustrates a table when this instruction is received.

Thus, the optimum rule application calculation unit 130 performs arbitration. Specifically, the value of $x_i$ is determined that maximizes the objective function $z=\Sigma^n_{i=1}(p_i x_i + y_i)$ (constraint condition $\Sigma^n_{i=1} c_i x_i < b$, $x_i \in \{0, 1\}$, $-1 \leq y_i \leq 1$ (i=1, 2, ... , n), $p_i \geq 0$, $c_i \geq 0$, $\forall i \in n$)).

In this case, $x_1=0$, $x_2=1$, and $x_3=1$ are obtained as a solution, and cells in the column of $x_i$ in the table in FIG. 17 are rewritten to 0, 1, and 1 from the top. As a result, the output unit 140 transmits, to the PCEF 20, a rule application instruction indicating that Rule #1 is not to be applied to Device #1, Rule #2 is to be applied thereto, and Rule #3 is to be applied thereto. The PCEF 20 executes rule application in accordance with the instruction.

Example 3

Figure 18:
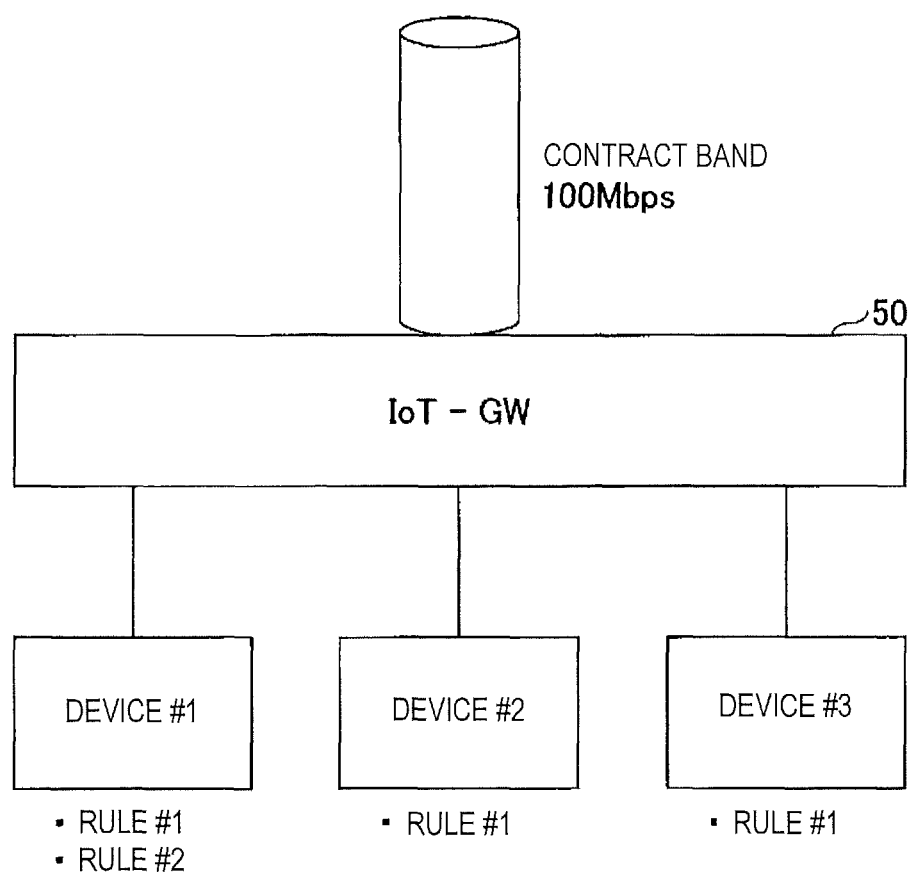
FIG. 18 is a diagram for description of a specific example.

The following describes Example 3. Example 3 assumes a case in which application of one rule to one device and application of a plurality of rules to one device are combined as illustrated in FIG. 18.

In Example 3, Devices #1, #2, and #3 are accommodated in Line #1 (contract band: 100). Allocated bands of 20 and 30 are already allocated to Device #1 by the own NW as Rules #1 and #2 for Device #1. Their priorities are 1 and 2. In addition, an allocated band of 40 is already allocated to Device #3 as Rule #1 for Device #3. Its priority is 1.

In this case, the storage unit 150 of the PCRF stores a table having data of Devices #1 and #3 in FIG. 19.

Consider a case in which an instruction for application of a rule with a priority of 2 and an allocated band of 40 is received as Rule #1 for Device #2 through an API. In this case, the sum of allocated bands is 130, which exceeds 100. FIG. 19 illustrates a table when this instruction is received.

Thus, the optimum rule application calculation unit 130 performs arbitration. Specifically, the value of $x_{ij}$ is determined that maximizes the objective function $z=\Sigma_i \Sigma_j (p_{ij} x_{ij} + y_{ij})$ (constraint condition $\Sigma_i \Sigma_j c_{ij} x_{ij} < b$, $x_{ij} \in \{0, 1\}$, $-1 \leq y_{ij} \leq 1$ (i=1, 2, ..., n, and j=1, 2, ..., k), $p_{ij} \geq 0$, $c_{ij} \geq 0$, $\forall i \in n$ and $\forall j \in k$)). The number k is the number of rules for each i.

In this case, $z=(p_{11}x_{11}+y_{11})+(p_{12}x_{12}+y_{12})+(p_{21}x_{21}+y_{21})+(p_{31}x_{31}+y_{31})$, and $x_{11}=1$, $x_{12}=1$, $x_{21}=1$, and $x_{31}=0$ can be obtained as a solution under constraint conditions. Cells in the column of $x_{ij}$ in the table in FIG. 19 are rewritten to 1, 1, 1, and 0 from the top. As a result, the output unit 140 transmits, to the PCEF 20, a rule application instruction indicating that Rules #1 and #2 are to be applied to Device #1, Rule #1 is to be applied to Device #2, and Rule #1 is not to be applied to Device #3. The PCEF 20 executes rule application in accordance with the instruction.

Effects of Embodiment and Summary

As described above, with the technology according to the present embodiment, the PCRF 100 can determine optimum policies, the sum of priorities of which is maximized while band constraint conditions are satisfied, when a resource conflict based on a plurality of policy rules occurs for a device. In addition, the PCRF 100 can notify the source of a policy application instruction of the status of policy application through an API.

The present specification includes at least an apparatus, a method, and a computer program, which are written in the following items.

(Item 1)

A resource conflict arbitration apparatus that arbitrates a conflict between resources, the resource conflict arbitration apparatus including:

reception means configured to receive a request for resource allocation to a device among one or more devices;

determination means configured to determine, when a resource requested by the resource allocation request is to be allocated to the device, whether a summed value of resources allocated to the one or more devices exceeds an upper limit value of available resources; and calculation means configured to determine, when it is determined by the determination means that the summed value exceeds the upper limit value, a status of resource allocation to each device to maximize a sum of priorities of resource allocation to the one or more devices under a constraint condition that a summed value of resources allocated to the devices does not exceed the upper limit value.

(Item 2)

The resource conflict arbitration apparatus according to Item 1, further including output means configured to notify, based on a result of the calculation by the calculation means, a request source of the resource allocation request of an application status of the resource allocation request.

(Item 3)

The resource conflict arbitration apparatus according to Item 1 or 2, in which the resource is a communication band, and the resource allocation request is a policy rule, application of which is instructed through an API.

(Item 4)

A resource conflict arbitration method executed by a resource conflict arbitration apparatus that arbitrates a conflict between resources, the resource conflict arbitration method including:

a reception step of receiving a request for resource allocation to a device among one or more devices;

a determination step of determining, when a resource requested by the resource allocation request is to be allocated to the device, whether a summed value of resources allocated to the one or more devices exceeds an upper limit value of available resources; and a calculation step of determining, when it is determined by the determination step that the summed value exceeds the upper limit value, a status of resource allocation to each device to maximize a sum of priorities of resource allocation to the one or more devices under a constraint condition that a summed value of resources allocated to the devices does not exceed the upper limit value.

(Item 5)

A computer program for causing a computer to function as each means of the resource conflict arbitration apparatus according to any one of Items 1 to 3.

Although the present embodiment is described above, the present invention is not limited to such a particular embodiment but may be modified and changed in various kinds of manners within the scope of the present invention recited in the claims.

REFERENCE SIGNS LIST 10, 100 PCRF
20 PCEF
30 user
40 other business operator
50 IoT-GW
110 input unit
120 determination unit
130 optimum rule application calculation unit
140 output unit
150 storage unit
1000 drive apparatus
1002 auxiliary storage apparatus
1003 memory apparatus
1004 CPU
1005 interface apparatus
1006 display apparatus
1007 input apparatus

The invention claimed is:

1. A resource conflict arbitration apparatus that arbitrates a conflict between resources, the resource conflict arbitration apparatus comprising a hardware circuitry functioning as:

reception means configured to receive a request for resource allocation to a device among one or more devices;

determination means configured to determine, when a resource requested by the resource allocation request is to be allocated to the device, whether a summed value of resources allocated to the one or more devices exceeds an upper limit value of available resources; and calculation means configured to determine, when it is determined by the determination means that the summed value exceeds the upper limit value, a status of resource allocation to each device to maximize a sum of priorities of resource allocation to the one or more devices under a constraint condition that a summed value of resources allocated to the devices does not exceed the upper limit value.

2. The resource conflict arbitration apparatus according to claim 1, further comprising output means configured to notify, based on a result of the calculation by the calculation means, a request source of the resource allocation request of an application status of the resource allocation request.

3. The resource conflict arbitration apparatus according to claim 1, wherein the resource is a communication band, and the resource allocation request is a policy rule, application of which is instructed through an API.

4. A resource conflict arbitration method executed by a resource conflict arbitration apparatus that arbitrates a conflict between resources, the resource conflict arbitration method comprising:

a reception step of receiving a request for resource allocation to a device among one or more devices;

a determination step of determining, when a resource requested by the resource allocation request is to be allocated to the device, whether a summed value of resources allocated to the one or more devices exceeds an upper limit value of available resources; and a calculation step of determining, when it is determined by the determination step that the summed value exceeds the upper limit value, a status of resource allocation to each device to maximize a sum of priorities of resource allocation to the one or more devices under a constraint condition that a summed value of resources allocated to the devices does not exceed the upper limit value.

5. A non-transitory computer readable medium storing a computer program for causing a computer to function as each means of a resource conflict arbitration apparatus that arbitrates a conflict between resources, the resource conflict arbitration apparatus comprising:
    reception means configured to receive a request for resource allocation to a device among one or more devices;
    determination means configured to determine, when a resource requested by the resource allocation request is to be allocated to the device, whether a summed value of resources allocated to the one or more devices exceeds an upper limit value of available resources; and
    calculation means configured to determine, when it is determined by the determination means that the summed value exceeds the upper limit value, a status of resource allocation to each device to maximize a sum of priorities of resource allocation to the one or more devices under a constraint condition that a summed value of resources allocated to the devices does not exceed the upper limit value.

\* \* \* \* \*